United States Patent
Kajiwara et al.

(10) Patent No.: US 11,063,280 B2
(45) Date of Patent: Jul. 13, 2021

(54) FUEL CELL SYSTEM

(71) Applicant: TOYOTA JIDOSHA KABUSHIKI KAISHA, Toyota (JP)

(72) Inventors: Shigeto Kajiwara, Okazaki (JP); Keiichi Toriumi, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 37 days.

(21) Appl. No.: 16/459,093

(22) Filed: Jul. 1, 2019

(65) Prior Publication Data
US 2020/0052313 A1    Feb. 13, 2020

(30) Foreign Application Priority Data

Aug. 7, 2018 (JP) .............................. JP2018-148278

(51) Int. Cl.
*H01M 8/04858* (2016.01)
*H01M 8/04014* (2016.01)
(Continued)

(52) U.S. Cl.
CPC ....... *H01M 8/04731* (2013.01); *B60L 3/0053* (2013.01); *H01M 8/04014* (2013.01);
(Continued)

(58) Field of Classification Search
CPC ...... F28D 2021/0043; H01M 8/04014; H01M 8/04029; H01M 8/04074; H01M 2250/20; H01M 8/04731; H01M 8/4723; H01M 8/0488; H01M 8/04686; H01M 8/04044; H01M 8/04656; H01M 8/04007; H01M 8/0267; H01M 8/04951; H01M 8/04947; H01M 8/04888; H01M 8/04992;
(Continued)

(56) References Cited

U.S. PATENT DOCUMENTS

2008/0197832 A1* 8/2008 Yokoyama ........ H01M 8/04029
324/72
2010/0167151 A1* 7/2010 Nagasawa ................ B60K 1/04
429/437
(Continued)

FOREIGN PATENT DOCUMENTS

JP    2007-157631    6/2007

*Primary Examiner* — Ula C Ruddock
*Assistant Examiner* — Mary Grace Byram
(74) *Attorney, Agent, or Firm* — Finnegan, Henderson, Farabow, Garrett & Dunner, LLP

(57) ABSTRACT

A fuel cell system includes a plurality of electrical components that are supplied with electric power generated by a fuel cell, a refrigerant circuit that cools the fuel cell using a refrigerant, a tank that is connected to the refrigerant circuit, stores the refrigerant, and is replenished with the refrigerant, a detecting unit that detects an insulation resistance value of the fuel cell system, and an identification unit that identifies at what position of the fuel cell system the insulation resistance value has decreased when it is detected that the insulation resistance value has decreased. The detecting unit performs a process of determining whether the decrease in insulation resistance value is temporary when the identified position is the fuel cell and determines that there is no failure requiring repair when the decrease in insulation resistance value is temporary.

1 Claim, 7 Drawing Sheets

(51) Int. Cl.
    *H01M 8/04701*    (2016.01)
    *B60L 3/00*    (2019.01)
    *H01M 8/04007*    (2016.01)
    *H01M 8/04029*    (2016.01)

(52) U.S. Cl.
    CPC ... *H01M 8/04029* (2013.01); *H01M 8/04074* (2013.01); *H01M 8/0488* (2013.01); *H01M 8/04723* (2013.01); *H01M 2250/20* (2013.01)

(58) Field of Classification Search
    CPC ........ B60L 3/0053; B60L 3/12; B60L 3/0023; B60L 58/30
    See application file for complete search history.

(56) References Cited

U.S. PATENT DOCUMENTS

| | | | |
|---|---|---|---|
| 2017/0214069 A1* | 7/2017 | Hoshi | H01M 8/04731 |
| 2018/0198139 A1* | 7/2018 | Ikoma | H01M 8/04074 |
| 2018/0280496 A1* | 10/2018 | Ciaramella | A61P 31/12 |

* cited by examiner

FUEL CELL SYSTEM

INCORPORATION BY REFERENCE

The disclosure of Japanese Patent Application No. 2018-148278 filed on Aug. 7, 2018 including the specification, drawings and abstract is incorporated herein by reference in its entirety.

BACKGROUND

1. Technical Field

The disclosure relates to a fuel cell system.

2. Description of Related Art

Japanese Unexamined Patent Application Publication No. 2007-157631 (JP 2007-157631 A) discloses a fuel cell system that can identify in which of a plurality of electrical components constituting the fuel cell system an electric leakage has occurred when the electric leakage has been detected in the fuel cell system.

SUMMARY

In a fuel cell system, a cooling circuit that cools a fuel cell with a refrigerant is provided. An FC stack coolant which is a refrigerant having high insulation is used as such a refrigerant. When an amount of the refrigerant decreases, a reservoir tank which is connected to the cooling circuit is replenished with the refrigerant. Here, a general user may erroneously replenish a reservoir tank with a refrigerant which is used to cool an internal combustion engine, for example, a long life coolant (LLC), instead of an FC stack coolant. In this case, since an LLC includes a component having high conductivity, the refrigerant circulates in the refrigerant circuit by operation of the fuel cell system, an insulation resistance value decreases at a time at which the LLC arrives at an insulation resistance value measuring area in the cooling circuit, and it is detected that an electric leakage has occurred somewhere in the fuel cell system. Thereafter, identification or repair of an electric leakage position is performed in a state in which the fuel cell system is stopped. Accordingly, when the LLC is not present in the insulation resistance value measuring area, there is a difficulty that the electric leakage position cannot be identified. There is a difficulty that it cannot be determined whether this electric leakage requires repair or what is to be repaired.

(1) According to an aspect of the disclosure, there is provided a fuel cell system including: a fuel cell that generates electric power; a plurality of electrical components that are supplied with the electric power generated by the fuel cell; a refrigerant circuit that cools the fuel cell using a refrigerant; a tank that is connected to the refrigerant circuit, is configured to store the refrigerant, and is replenished with the refrigerant; an insulation resistance value detecting unit configured to detect an insulation resistance value of the fuel cell system; and an identification unit configured to identify at what position of the fuel cell system the insulation resistance value has decreased when it is detected that the insulation resistance value has decreased. The insulation resistance value detecting unit is configured to perform a process of determining whether the decrease in insulation resistance value is temporary when the identified position is the fuel cell and to determine that there is no failure requiring repair when the decrease in insulation resistance value is temporary. According to this aspect, when a decrease in insulation resistance value has been detected and the position at which the insulation resistance value has decreased is in the fuel cell, it is possible to determine whether repair of the fuel cell is required or whether the decrease in insulation resistance value is temporary, which does not require repair.

(2) The fuel cell system may further include an ion exchanger that is provided in the refrigerant circuit and exchanges impurity ions included in the refrigerant. The insulation resistance value detecting unit may be configured to: i) detect the insulation resistance value in a state in which the refrigerant does not flow in the ion exchanger; ii) then detect the insulation resistance value in a state in which the refrigerant flows in the ion exchanger; and iii) determine, when the insulation resistance value is restored from the decreased insulation resistance value, that the decrease in insulation resistance value is temporary due to an erroneous refrigerant that decreases the insulation resistance value and with which the tank is replenished. According to this configuration, it is possible to determine whether the cause of the temporary decrease in insulation resistance value is that the tank is erroneously replenished with a refrigerant that decreases the insulation resistance value.

(3) The disclosure can also be embodied in various forms other than the fuel cell system. For example, the disclosure can be embodied in the form of an electric leakage detecting method or an erroneous refrigerant replenishment detecting method in a fuel cell system.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
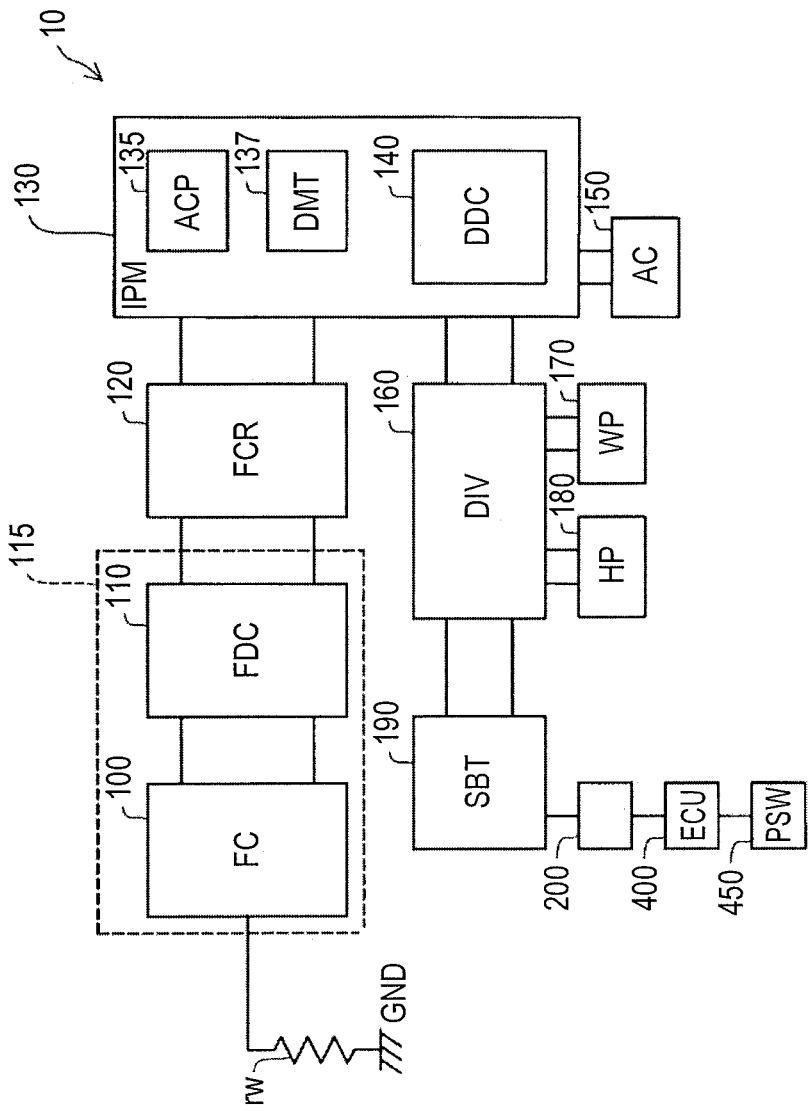
FIG. 1 is a diagram schematically illustrating a configuration of a fuel cell system which is mounted in a vehicle.

FIG. 1 is a diagram schematically illustrating a configuration of a fuel cell system 10 which is mounted in a vehicle. The fuel cell system 10 includes a fuel cell unit 100, an FC converter unit 110, an FC relay unit 120; an intelligent power module unit 130 (hereinafter abbreviated to "IPM 130"), an air conditioner unit 150, a division unit 160, a refrigerant pump unit 170, a hydrogen pump unit 180, a secondary battery unit 190, an electric leakage detector 200, and a control unit 400 (also referred to as an "ECU 400"). The IPM 130 includes an air compressor unit 135, a drive motor unit 137, and a DC-DC converter 140 (referred to as a "DDC converter 140").

The FC converter unit 110 is connected to the fuel cell unit 100, and the FC relay unit 120 is connected to the FC converter unit 110. The fuel cell unit 100 and the FC converter unit 110 are collectively referred to as a "fuel cell area 115" or an "FC area 115." The IPM 130 is connected to the FC relay unit 120. The air conditioner unit 150 and the division unit 160 are connected to the IPM 130. The refrigerant pump unit 170, the hydrogen pump unit 180, and the secondary battery unit 190 are connected to the division unit 160. The electric leakage detector 200 is connected to the secondary battery unit 190. In FIG. 1, an electrical resistance value rw which is illustrated between the fuel cell unit 100 and a ground node GND is an electrical resistance value of a refrigerant for cooling a fuel cell.

The ECU 400 controls the fuel cell system 10. In FIG. 1, only a control line that connects the electric leakage detector 200 and the ECU 400 is illustrated and control lines that connect the other units of the fuel cell system 10 to the ECU 400 are not illustrated. A power switch 450 that turns the fuel cell system 10 on and off is connected to the ECU 400.

Figure 2:
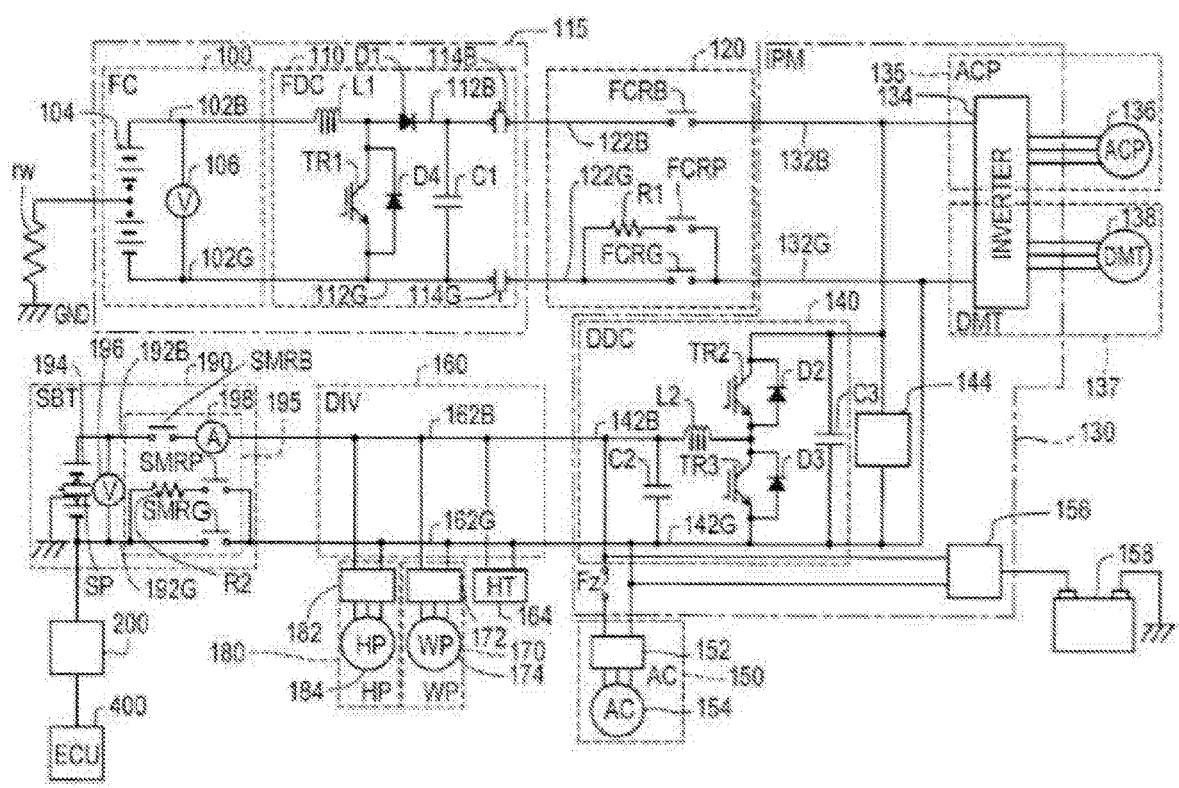
FIG. 2 is a diagram illustrating the fuel cell system in more detail.

FIG. 2 is a diagram illustrating the fuel cell system 10 in more detail. The fuel cell unit 100 includes high-voltage lines 102B and 102G, a fuel cell 104, and a voltage meter 106. Suffix "B" of the reference signs of the high-voltage lines 102B and 102G refers to a plus-side member and suffix "G" refers to a minus-side member. Suffixes "B" and "G" are the same for reference signs of other members which will be described later. An output of the fuel cell 104 is output to the FC converter unit 110.

The FC converter unit 110 is an electrical component that includes high-voltage lines 112B and 112G, service plugs 114B and 114G, a reactor L1, a switching transistor TR1, a diode D1, a protection diode D4, and a smoothing capacitor C1. One terminal of the reactor L1 is connected to the high-voltage line 102B of the fuel cell unit 100, and the other terminal of the reactor L1 is connected to an anode of the diode D1. A cathode of the diode D1 is connected to the plus-side service plug 114B via the high-voltage line 112B. The high-voltage line 102G of the fuel cell unit 100 is connected to the minus-side service plug 114G via the high-voltage line 112G. The switching transistor TR1 is provided between the anode of the diode D1 and the high-voltage line 112G. The protection diode D4 is provided in parallel to the switching transistor TR1. The FC converter unit 110 steps up a voltage input from the fuel cell unit 100 and outputs the stepped-up voltage to the FC relay unit 120 by turning the switching transistor TR1 on and off.

The FC relay unit 120 includes high-voltage lines 122B and 122G, a plus-side contact (hereinafter referred to as an "FC relay FCRB"), a minus contact (hereinafter referred to as an "FC relay FCRG"), a precharge contact (hereinafter referred to as a "precharge relay FCRP"), and a resistor R1. The plus-side relay RCRB is provided in the plus-side high-voltage line 122B and the minus-side FC relay RCRG is provided in the minus-side high-voltage line 122G. The precharge relay FCRP and the resistor R1 are connected in series and are provided in parallel to the minus-side FC relay FCRG. When the plus-side FC relay FCRB is turned on and then the precharge relay FCRP is turned on before the minus-side FC relay FCRG is turned on, only a limited current flows in the relay FCRP due to the resistor R1. As a result, the relay FCRP is not welded when it is turned on. Thereafter, when the FC relay FCRG is turned on after a difference in voltage between both sides of the FC relay FCRG decreases, a large arc current does not flow and the FC relay FCRG is not welded when the FC relay FCRG is turned on.

The IPM 130 is an electrical component that includes high-voltage lines 132B, 132G, 142B, and 142G, an inverter 134, a DDC converter 140, and a discharge mechanism 144. The inverter 134 is an electrical component including a two-channel inverter circuit (not illustrated) and converts DC power supplied to the high-voltage lines 132B and 132G into two three-phase AC currents. An air compressor 136 and a drive motor 138 are connected to the two-channel inverter circuit. That is, the inverter 134 supplies three-phase AC power to the air compressor 136 and the drive motor 138. The air compressor 136 is an electrical component that supplies air to the fuel cell 104. The drive motor 138 is an electrical component that drives driving wheels (not illustrated) of the vehicle. The drive motor 138 functions as a regenerative motor at the time of deceleration of the vehicle. The inverter circuit of one channel of the inverter 134 and the air compressor 136 constitute an air compressor unit 135, and the inverter circuit of the other channel of the inverter 134 and the drive motor 138 constitute a drive motor unit 137.

The DDC converter 140 is a bidirectional DC-DC converter that steps down a voltage input to the high-voltage lines 132B and 132G, outputs the stepped-down voltage to the division unit 160 via the high-voltage lines 142B and 142G, steps up a voltage input from the division unit 160 via the high-voltage lines 142B and 142G and outputs the stepped-up voltage to the high-voltage lines 132B and 132G The DDC converter 140 includes a reactor L2, switching transistors TR2 and TR3, protection diodes D2 and D3, and smoothing capacitors C2 and C3. The switching transistors TR2 and TR3 are provided in series between the plus-side high-voltage line 132B and the minus-side high-voltage line 132G The protection diode D2 is provided in parallel to the switching transistor TR2, and the protection diode D3 is provided in parallel to the switching transistor TR3. The reactor L2 is provided between an intermediate node between the switching transistors TR2 and TR3 and the plus-side high-voltage line 142B. The smoothing capacitor C2 is provided between the plus-side high-voltage line 142B and the minus-side high-voltage line 142G. The high-voltage lines 132G and 142G on the minus side are connected to each other and have the same potential. The smoothing capacitor C3 is provided between the plus-side high-voltage line 132B and the minus-side high-voltage line 132G.

When the vehicle decelerates, the drive motor 138 (also referred to as a "traction motor 138") functions as a regenerative motor, regenerates electric power, and activates a regenerative brake. The regenerated power is charged in a secondary battery 194. However, when the secondary battery 194 is fully charged, the secondary battery 194 cannot be charged and thus a regenerative brake can be activated by the drive motor 138. In this case, the discharge mechanism 144 enables the drive motor 138 to function as a regenerative brake by consuming the regenerated power.

The air conditioner unit 150 includes an inverter 152 and an air conditioner 154. The air conditioner 154 is an electrical component that performs air-conditioning in the vehicle. The inverter 152 is an electrical component that is connected to the high-voltage lines 142B and 142G of the IPM 130. A fuse Fz is provided between the inverter 152 and the high-voltage line 142B. A step-down converter 156 is connected to the high-voltage lines 142B and 142G of the IPM 130, and a lead storage battery 158 is provided in the step-down converter 156. The step-down converter 156 is an electrical component that steps down a voltage of the high-voltage lines 142B and 142G into a voltage of the lead storage battery 158 and supplies the stepped-down voltage to the lead storage battery 158. The lead storage battery 158 is used as a power supply of low-voltage auxiliary machines of the vehicle such as the ECU 400, a turn signal, a headlight, a wiper, and a power window (not illustrated).

The division unit 160 is a device that includes high-voltage lines 162B and 162G and divides electric power. The heater 164, the refrigerant pump unit 170, and the hydrogen pump unit 180 are connected to the division unit 160. The refrigerant pump unit 170 includes an inverter 172 and a refrigerant pump 174. The refrigerant pump 174 circulates a refrigerant supplied to the fuel cell 104. Some of the refrigerant supplied to the fuel cell 104 is divided from the cooling channel and is used for warming up the vehicle. The heater 164 heats the divided refrigerant. The hydrogen pump unit 180 includes an inverter 182 and a hydrogen pump 184. The hydrogen pump 184 supplies hydrogen in exhaust gas discharged from the fuel cell 104 to the fuel cell 104 again.

The secondary battery unit 190 includes high-voltage lines 192B and 192G, a secondary battery 194, a system main relay 195, a voltage meter 196, a current meter 198, and a service plug SP. The system main relay 195 includes a plus contact (hereinafter referred to as a "system main relay SMRB"), a minus contact (hereinafter referred to as a "system main relay SMRG"), a precharge contact (hereinafter referred to as a precharge relay SMRP"), and a resistor R2. The plus-side system main relay SMRB is provided in the plus-side high-voltage line 192B, and the minus-side system main relay SMRG is provided in the minus-side high-voltage line 192G The precharge main relay SMRP and the resistor R2 are connected in series to each other and are connected in parallel to the minus-side system main relay SMRG. The service plug SP is provided in the secondary battery 194.

In this embodiment, the high-voltage lines 142B, 162B, and 192B from the DDC 140 to the secondary battery 194 have the same potential, and the high-voltage lines 142G, 162G, and 192G have the same potential.

The electric leakage detector 200 is connected to the minus side of the secondary battery 194, and the ECU 400 is connected to the electric leakage detector 200.

Figure 3:
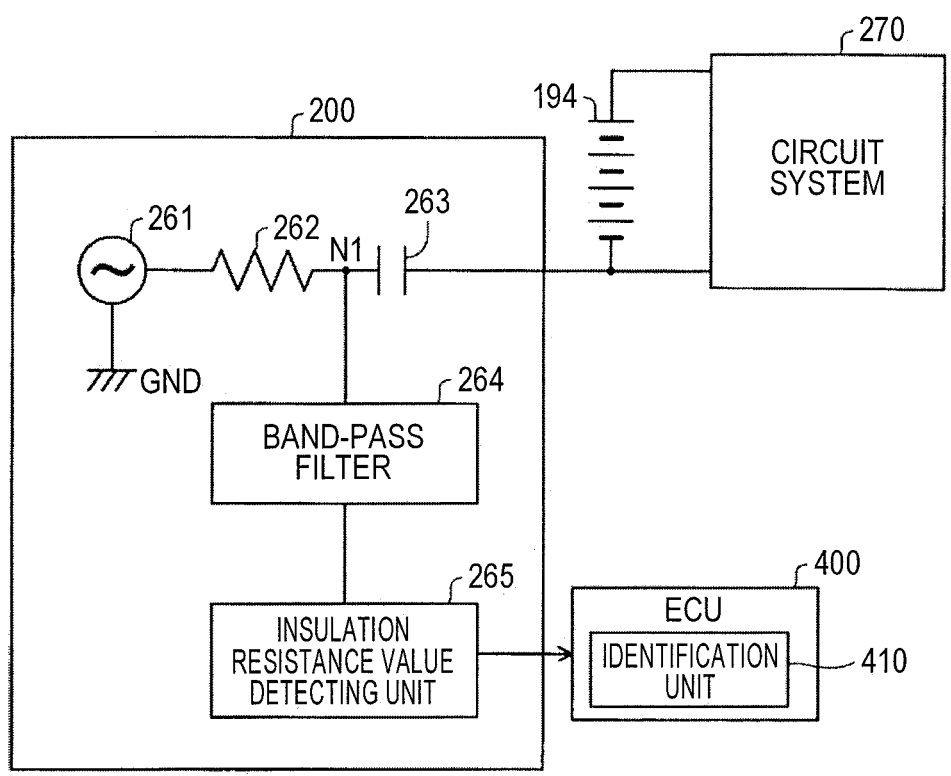
FIG. 3 is a diagram illustrating a configuration of an electric leakage detector.

FIG. 3 is a diagram illustrating a configuration of the electric leakage detector 200. The electric leakage detector 200 includes an AC power source 261, a resistor 262, a capacitor 263, a band-pass filter 264, and an insulation resistance value detecting unit 265.

The AC power source 261 and the resistor 262 are connected in series between the node N1 and the ground node GND (the chassis or body of the vehicle). The capacitor 263 is connected between the node N1 and the negative electrode of the secondary battery 194. In FIG. 3, all circuits connected to the secondary battery 194 are illustrated as a circuit system 270.

The AC power source 261 outputs an AC signal of a low frequency. The AC signal is a signal for detecting an electric leakage. The frequency of the AC signal in this embodiment is 2.5 Hz. The voltage of the AC signal in this embodiment is 5 V. The frequency and the voltage of the AC signal may have values other than 2.5 Hz and 5 V. The AC signal is input to the circuit system 270 via the capacitor 263. Accordingly, the circuit system 270 constituting a DC power supply circuit is separated from the electric leakage detector 200 in view of a DC current. Accordingly, the circuit system 270 is insulated from the ground node GND.

The band-pass filter 264 receives an input of the AC signal on the node N1. The band-pass filter 264 extracts a component of 2.5 Hz from the input AC signal and inputs the extracted component to the insulation resistance value detecting unit 265. The insulation resistance value detecting unit 265 holds a peak of the AC signal of 2.5 Hz input from the band-pass filter 264 as a crest value Vk and acquires an insulation resistance value r using the crest value Vk. The crest value Vk varies depending on whether there is an electric leakage, that is, the crest value Vk becomes smaller when the insulation resistance value r becomes smaller due to an electric leakage. That is, the insulation resistance value detecting unit 265 acquires the crest value Vk and can calculate the insulation resistance value r using the crest value Vk.

The ECU 400 includes an identification unit 410 that identifies a position at which the insulation resistance value r has decreased when the insulation resistance value r has decreased. How the identification unit 410 identifies a position at which the insulation resistance value r has decreased will be described later.

An electrical system and an electric leakage detecting method in the fuel cell system have been described above. Although an electric leakage is caused due to a decrease in insulation resistance value in the electrical circuits such as the FDC, the electric leakage detector 200 may detect an electric leakage even when the insulation resistance value has not decreased. A mechanism by which such an electric leakage occurs will be described below.

Figure 4:
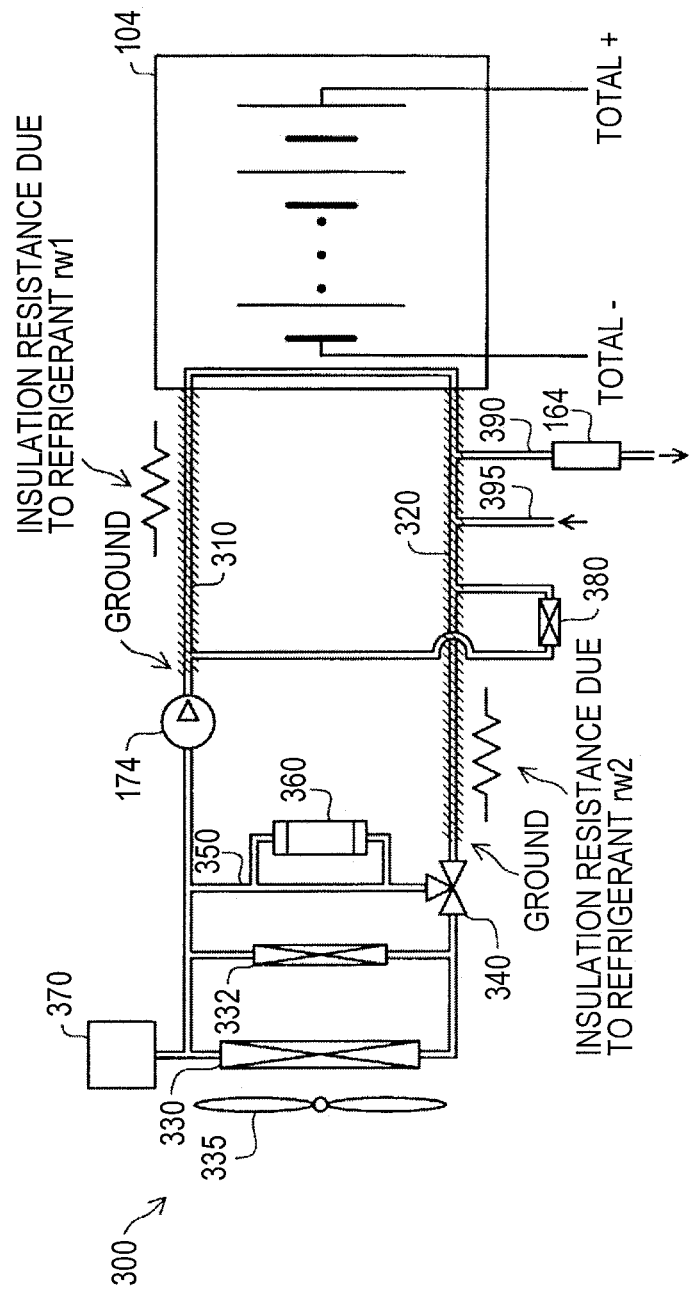
FIG. 4 is a diagram schematically illustrating a configuration of a cooling circuit of a fuel cell stack.

FIG. 4 is a diagram schematically illustrating a configuration of a cooling circuit 300 of the fuel cell 104. The cooling circuit 300 includes a refrigerant pump 174, a refrigerant supply pipe 310, a refrigerant discharge pipe 320, a radiator 330, a sub-radiator 332, a radiator fan 335, a three-way valve 340, a bypass pipe 350, an ion exchanger 360, and a tank 370.

The refrigerant pump 174 supplies a refrigerant to the fuel cell 104 via the refrigerant supply pipe 310. An FC stack coolant (FCC) is used as the refrigerant. The FC stack coolant is a nonconductive liquid including ethylene glycol and water as major components. The refrigerant discharged from the fuel cell 104 is sent to the radiator 330 and the sub-radiator 332 via the refrigerant discharge pipe 320 and is ventilated and cooled by the radiator fan 335. Thereafter, the refrigerant is sent to the refrigerant pump 174 and circulates in the cooling circuit 300. A part of the refrigerant discharged to the refrigerant discharge pipe 320 is sent to the refrigerant pump 174 via the bypass pipe 350 without passing through the radiator 330 or the sub-radiator 332 and circulates in the cooling circuit 300 in the same way. The ion exchanger 360 is provided in parallel to the bypass pipe 350.

The three-way valve 340 is a valve that divides the refrigerant from the refrigerant discharge pipe 320 to the radiator 330, the sub-radiator 332, and the bypass pipe 350. The three-way valve 340 is set to one of a state in which 100% of the refrigerant is caused to flow in the radiator 330 and the sub-radiator 332 and no refrigerant is caused to flow in the bypass pipe 350 and a state in which no refrigerant is caused to flow in the radiator 330 and the sub-radiator 332 and 100% of the refrigerant is caused to flow in the bypass pipe 350, based on the instruction from the ECU 400. The tank 370 is a reservoir tank for a refrigerant in the cooling circuit 300. When an amount of the refrigerant in the cooling circuit 300 decreases, a refrigerant is supplied from the tank 370 to the cooling circuit 300. When an amount of the refrigerant in the tank 370 decreases, a user of the vehicle or the like replenishes the tank 370 with a refrigerant. An intercooler 380 is a device that cools air which has been compressed into a high temperature by the air compressor 136 and is connected to the refrigerant supply pipe 310 and the refrigerant discharge pipe 320. In order to use waste heat of the fuel cell 104 for heating the inside of the vehicle, an air-conditioner refrigerant supply pipe 390 and an air-conditioner refrigerant discharge pipe 395 are connected to the refrigerant discharge pipe 320. A heater 164 is connected to the air-conditioner refrigerant supply pipe 390. The heater 164 is used to increase the temperature of the refrigerant when the temperature of the refrigerant is not sufficient to be used for heating.

The refrigerant pump 174, the three-way valve 340, the radiator 330, and the sub-radiator 332 of the cooling circuit 300 are formed of, for example, a metal, is attached to the body of the vehicle, and thus is electrically grounded to the ground node GND. In this embodiment, the body serves as the ground node GND. The refrigerant supply pipe 310 or the refrigerant discharge pipe 320 is formed of a nonconductive member, and the fuel cell 104 is installed in the vehicle in a state in which it is electrically disconnected from the body, that is, the ground node GND. Accordingly, the fuel cell 104 is insulated from the body of the vehicle. Here, the refrigerant pump 174, the three-way valve 340, the radiator 330, and the sub-radiator 332 are connected to the fuel cell 104 via the refrigerant. Accordingly, when electric conductivity of the refrigerant increases, an electric leakage via the refrigerant may occur. When an electrical resistance value between the fuel cell 104 and the ground node GND on the refrigerant supply pipe 310 side is defined as rw1 and an electric resistance value between the fuel cell 104 and the ground node GND on the refrigerant discharge pipe 320 side is defined as rw2, an electric resistance value rw between the fuel cell 104 and the ground node GND is calculated by $rw=rw1 \times rw2/(rw1+rw2)$.

Accordingly, in the fuel cell system, by using a fuel cell stack coolant having high insulation as the refrigerant and removing impurity ions by exchanging the impurity ions with protons (H+) or hydroxide ions (OH−) using the ion exchanger 360 provided in the cooling circuit 300 on the assumption that impurities such as rust at the time of use are mixed, electrical insulation of the fuel cell stack coolant which is the refrigerant is secured. Factors for the decrease in electric conductivity include erroneous use of a refrigerant in addition to mixture of impurity ions. This is caused when a normal vehicle LLC is erroneously injected into the tank 370 instead of the fuel cell stack coolant. The LLC of the tank 370 flows gradually into the tank 370 to complement the refrigerant consumed in the cooling circuit 300. Accordingly, when an insulation resistance value decreases temporarily due to flowing of the LLC and an electric leakage is detected, impurity ions in the LLC are removed by the function of the ion exchanger 360 after being used for a while and the insulation resistance value of the refrigerant is substantially returned to the original value.

Figure 5:
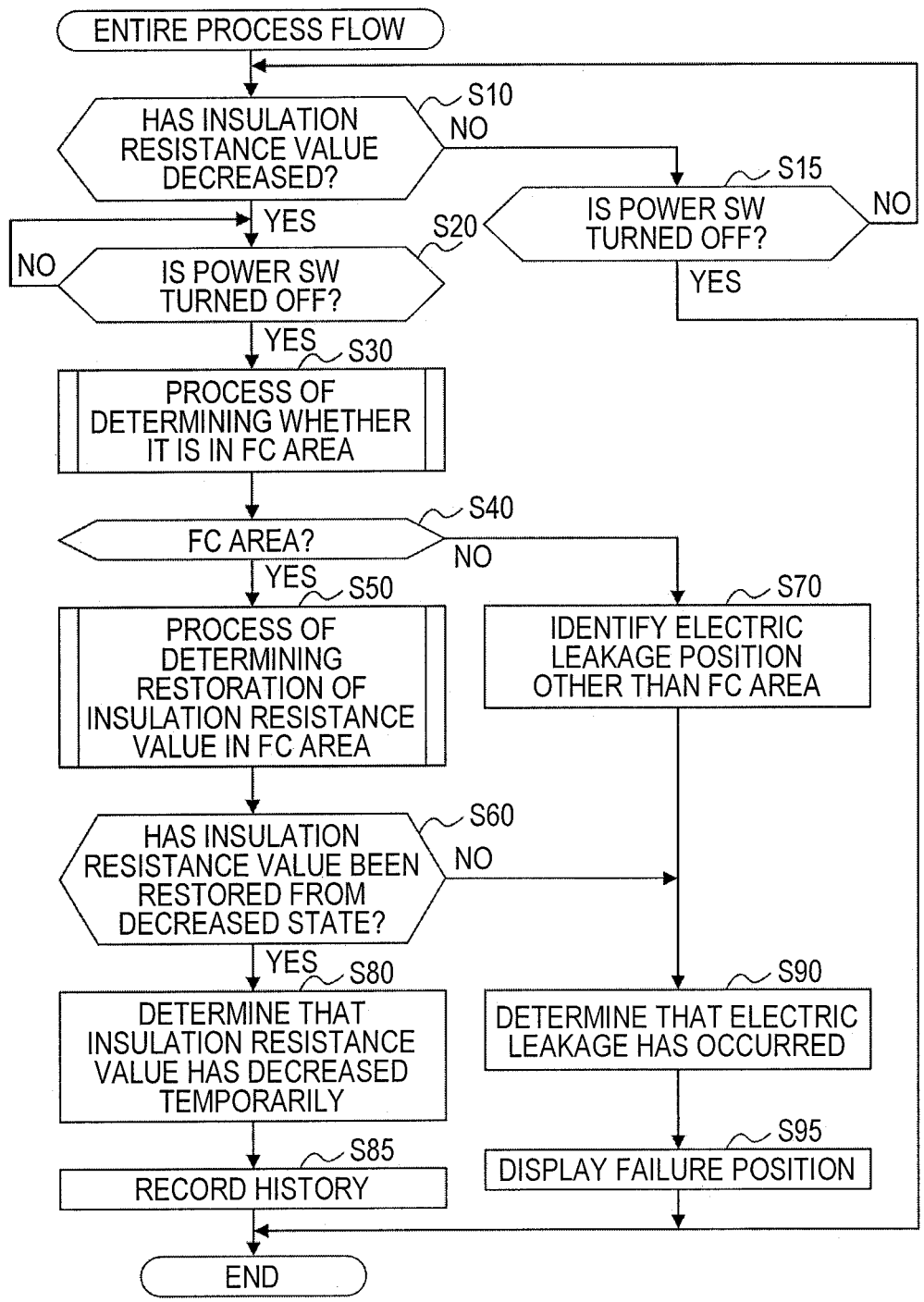
FIG. 5 is a flowchart illustrating an entire process flow.

Based on the assumption of this case, the insulation resistance value is detected using the following method in this embodiment. FIG. 5 is a flowchart illustrating an entire process flow which is performed by the insulation resistance value detecting unit 265. The insulation resistance value detecting unit 265 performs Step S10 of the process flow while the fuel cell system 10 is operated, and performs Step S30 and the steps subsequent thereto after the power switch 450 has been turned off.

When the insulation resistance value detecting unit 265 detects a decrease in insulation resistance value in Step S10, the process flow transitions to Step S20. When a decrease in insulation resistance value is not detected, the insulation resistance value detecting unit 265 repeatedly performs the determination of Step S10 until the power switch 450 is turned off in Step S15.

When the power switch 450 is turned off in Step S20, the insulation resistance value detecting unit 265 causes the process flow to transition to Step S30.

In Step S30, the insulation resistance value detecting unit 265 causes the identification unit 410 to perform a determination process of determining whether a position at which a decrease in insulation resistance value has occurred is in the FC area 115. Details of this process will be described later.

In Step S40, the insulation resistance value detecting unit 265 determines whether a position at which a decrease in insulation resistance value detected in Step S20 has occurred is in the FC area 115. The process proceeds to Step S50 when the position is in the FC area 115. The process proceeds to Step S70 when the position is not in the FC area 115. Details of the process of Step S50 will be described later.

In Step S50, the insulation resistance value detecting unit 265 performs an FC area insulation resistance restoration determining process of determining whether the insulation resistance value of the FC area 115 is restored from the decreased state. In Step S70, the insulation resistance value detecting unit 265 causes the identification unit 410 to identify an electric leakage position other than the FC area 115. A specific method of Step S70 is disclosed, for example, in JP 2007-157631 A and thus description thereof will not be repeated in this specification.

In Step S60, it is determined whether the insulation resistance value of the FC area 115 has been restored from the decreased state through the process of Step S50. The process flow transitions to Step S80 when the insulation resistance value has been restored, and the process flow transitions to Step S90 when the insulation resistance value has not been restored.

In Step S80, the insulation resistance value detecting unit 265 determines that the decrease in insulation resistance value in the FC area 115 is temporary, and records a history indicating that a temporary decrease in insulation resistance value has occurred in the FC area 115 in Step S85. The temporary decrease in insulation resistance value occurs, for example, when the tank 370 is erroneously replenished with an LLC.

In Step S90, the insulation resistance value detecting unit 265 determines that the decrease in insulation resistance value is not temporary and is caused due to an electric leakage, and displays a failure position at which an electric leakage has been identified to occur, for example, on an instrument panel or the like in Step S95. The failure position at which an electric leakage has been identified to occur is identified in Steps S40 to S60 or Step S70.

Figure 6:
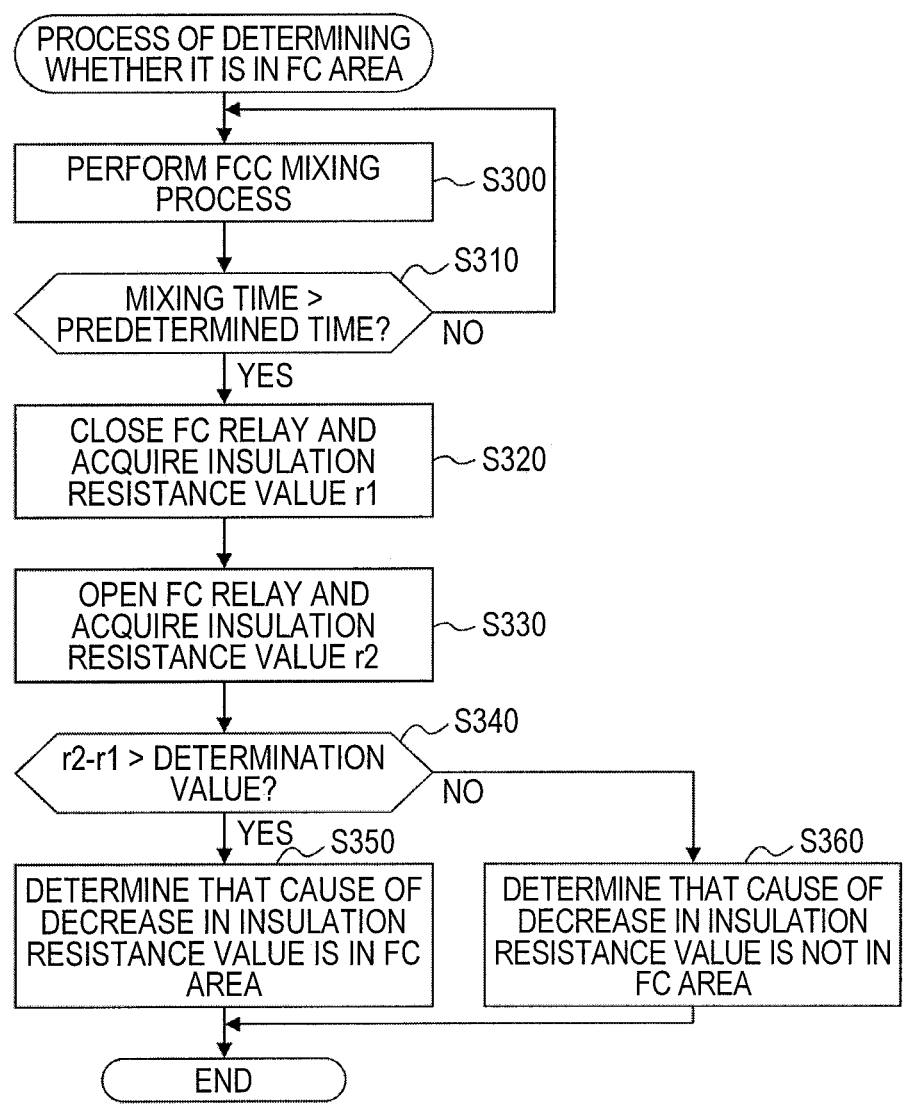
FIG. 6 is a flowchart illustrating a process flow of determining whether a position at which a decrease in insulation resistance value has occurred is in an FC area.

FIG. 6 is a flowchart illustrating a process flow of determining whether the position at which the decrease in insulation resistance value has occurred is in the FC area 115 or not, which is performed in Step S30 of FIG. 5. In Step S300, the insulation resistance value detecting unit 265 causes the ECU 400 to switch the three-way valve 340 such that the whole refrigerant discharged from the fuel cell 104 is supplied to the radiator 330 and the sub-radiator 332. In this state, the refrigerant pump 174 is driven to perform a fuel cell stack coolant mixing process.

In Step S310, when a mixing time in which the mixing process of Step S300 is performed is greater than a predetermined time, the process flow transitions to Step S320. The value of the predetermined time can range, for example, from several tens of seconds to 1 minute.

In Step S320, the insulation resistance value detecting unit 265 acquires an insulation resistance value r1 of the fuel cell system 10 in a state in which the FC relays FCRB and FCRG are closed.

In Step S330, the insulation resistance value detecting unit 265 acquires an insulation resistance value r2 of the fuel cell system 10 in a state in which the FC relays FCRB and FCRG are open.

In Step S340, the insulation resistance value detecting unit 265 determines whether a value obtained by subtracting the insulation resistance value r1 from the insulation resistance value r2 is greater than a determination value. The determination value is a value which is greater than zero. When it is determined in Step S340 that the value obtained by subtracting the insulation resistance value r1 from the insulation resistance value r2 is greater than the determination value, the identification unit 410 determines that the factor for the decrease in insulation resistance value is in the FC area 115 in Step S350. On the other hand, when it is determined that the value obtained by subtracting the insulation resistance value r1 from the insulation resistance value r2 is less than the determination value, the identification unit 410 determines that the factor for the decrease in insulation resistance value is other than the FC area 115 in Step S360. The reason is as follows.

The insulation resistance value r2 is an insulation resistance value of the fuel cell system 10 from which the FC area 115 is excluded. The insulation resistance value r1 is an insulation resistance value when an insulation resistor of the FC area 115 and an insulation resistor of the fuel cell system 10 from which the FC area 115 is excluded are connected in parallel. Accordingly, when the insulation resistance value of the FC area 115 is very large, the insulation resistance value r1 is almost the same as the insulation resistance value r2 of the fuel cell system 10 from which the FC area 115 is excluded. On the other hand, when the insulation resistance value of the FC area 115 is small, the insulation resistance value r1 is less than the insulation resistance value of the fuel cell system 10 from which the FC area 115 is excluded. Accordingly, when the insulation resistance value of the FC area 115 is small, the insulation resistance value r1 is less than the insulation resistance value r2 of the fuel cell system 10 from which the FC area 115 is excluded, and thus the value obtained by subtracting the insulation resistance value r1 from the insulation resistance value r2 is a large positive value. Accordingly, when the value obtained by subtracting the insulation resistance value r1 from the insulation resistance value r2 is greater than the determination value, it can be determined that the insulation resistance value of the FC area 115 is small, that is, that the factor of the decrease in insulation resistance value is in the FC area 115. On the other hand, when the insulation resistance value of the FC area 115 is very large, the insulation resistance value r1 is almost the same as the insulation resistance value r2 of the fuel cell system 10 from which the FC area 115 is excluded and thus the value obtained by subtracting the insulation resistance value r1 from the insulation resistance value r2 is almost zero. Accordingly, when the value obtained by subtracting the insulation resistance value r1 from the insulation resistance value r2 is less than the determination value, it can be determined that the insulation resistance value of the FC area 115 is large, that is, that the factor for the decrease in insulation resistance value is other than the FC area 115.

Figure 7:
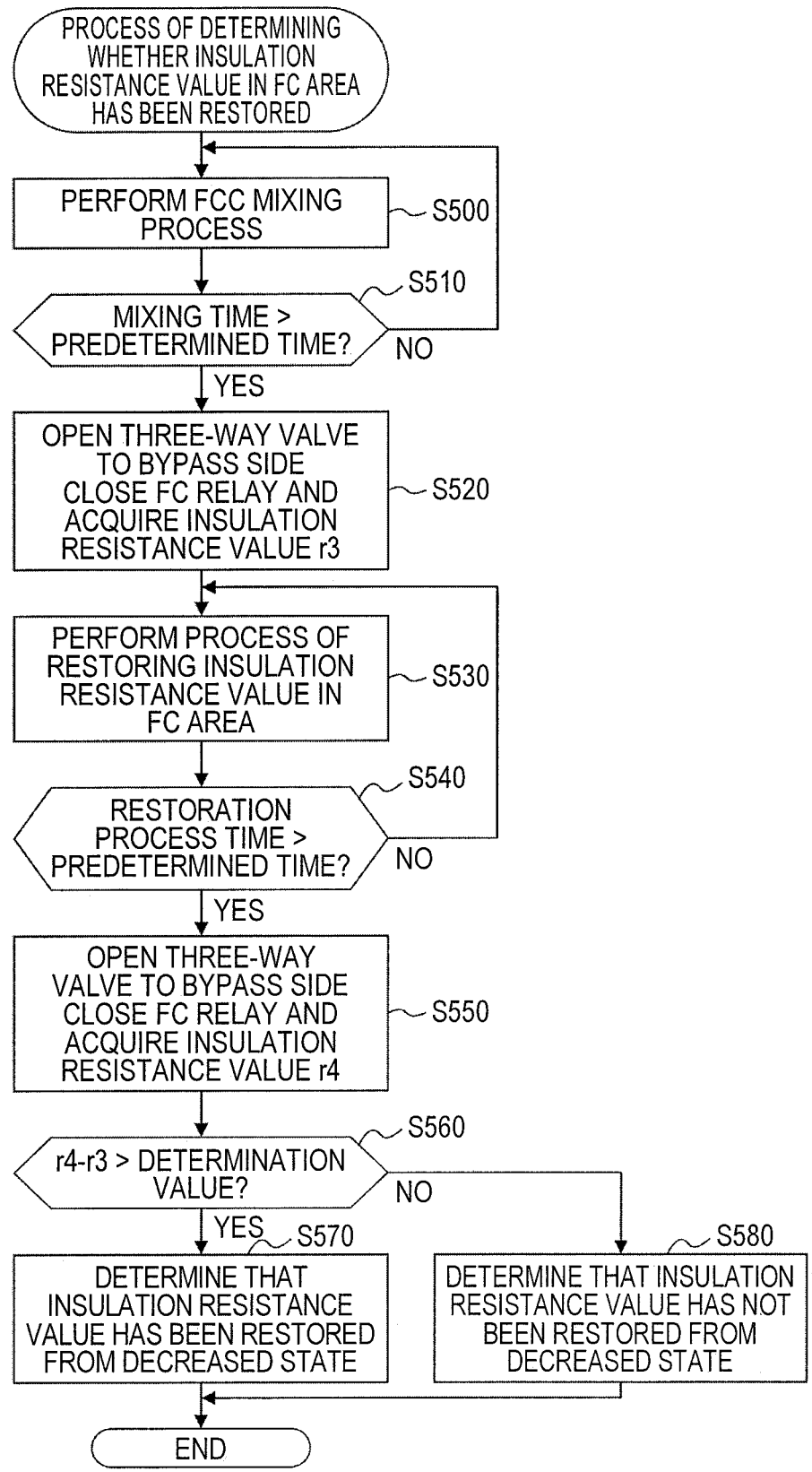
FIG. 7 is a flowchart illustrating a process flow of returning from a decrease in insulation resistance value in an FC area.

FIG. 7 is a flowchart illustrating a process flow of determining restoration from the decrease in insulation resistance value of the FC area 115, which is performed in Step S50 in FIG. 5. In Step S500, the insulation resistance value detecting unit 265 causes the ECU 400 to switch the three-way valve 340 such that the whole refrigerant discharged from the fuel cell 104 is supplied to the radiator 330 and the sub-radiator 332 and the refrigerant does not flow into the bypass pipe 350. In this state, the refrigerant pump 174 is driven to perform a fuel cell stack coolant mixing process. In Step S510, when a mixing time in which the mixing process of Step S500 is performed is greater than a predetermined time, the process flow transitions to Step S520. The predetermined time can range, for example, from several tens of seconds to 1 minute.

In Step S520, the insulation resistance value detecting unit 265 causes the ECU 400 to switch the three-way valve 340 such that the whole refrigerant discharged from the fuel cell 104 flows into the bypass pipe 350, and to connect the FC relays FCRB and FCRG. The insulation resistance value detecting unit 265 acquires an insulation resistance value r3 in this state.

In Step S530, the insulation resistance value detecting unit 265 performs a process of restoring the insulation resistance value of the FC area. Specifically, the insulation resistance value detecting unit 265 causes the ECU 400 to drive the refrigerant pump 174 in the state of Step S520. The refrigerant flows into the bypass pipe 350 and a part of the refrigerant flows into the ion exchanger 360. Accordingly, when there are impurity ions in the refrigerant, the impurity ions are removed by the ion exchanger 360. When the restoration process is performed for a time longer than a predetermined time in Step S540, the process flow transitions to Step S550. The predetermined time can range, for example, from several tens of seconds to 1 minute.

In Step S550, the insulation resistance value detecting unit 265 acquires an insulation resistance value r4 similarly to Step S520.

In Step S560, the insulation resistance value detecting unit 265 determines whether a value obtained by subtracting the insulation resistance value r3 from the insulation resistance value r4 is greater than a determination value. The determination value is a value greater than zero. The insulation resistance value detecting unit 265 determines that the insulation resistance value has been restored from the decreased state in Step S570 when the value obtained by subtracting the insulation resistance value r3 from the insulation resistance value r4 is greater than the determination value, and determines that the insulation resistance value has not been restored from the decreased state in Step S580 when the value is not greater than the determination value. The reason is as follows.

As described above, when there are impurity ions in the refrigerant, the impurity ions are removed by the ion exchanger 360 while performing the process of restoring the insulation resistance value of the FC area. In this case, the electric conductivity of the refrigerant decreases and the insulation resistance value increases. As a result, the insulation resistance value r4 becomes greater than the insulation resistance value r3. On the other hand, when there is no impurity ion in the refrigerant, removal of impurity ions is not performed and thus the electric conductivity does not substantially change. As a result, the magnitudes of the insulation resistance value r4 and the insulation resistance value r3 are almost the same. In this way, the insulation resistance value detecting unit 265 can determine whether the insulation resistance value has been restored, that is, whether there are impurity ions in a solvent and then the impurity ions are removed, using the value obtained by subtracting the insulation resistance value r3 from the insulation resistance value r4.

As described above, the fuel cell system 10 according to this embodiment includes the insulation resistance value detecting unit 265 that detects an insulation resistance value of the fuel cell system 10 and the identification unit 410 that identifies a position of the fuel cell system 10 at which the insulation resistance value has decreased when the decrease in insulation resistance value has been detected. When the position identified by the identification unit 410 is in the fuel cell 104, the insulation resistance value detecting unit 265 performs a process of determining whether the decrease in insulation resistance value is temporary. When the decrease in insulation resistance value in the fuel cell 104 is temporary, repair of the fuel cell 104 is not required. Accordingly, according to this embodiment, when the position at which the decrease in insulation resistance value has occurred is in the fuel cell 104, it is possible to determine whether the fuel cell 104 requires repair and whether the decrease in insulation resistance value is temporary, which does not require repair.

In the fuel cell system 10 according to this embodiment, the insulation resistance value detecting unit 265 detects an insulation resistance value r3 in a state in which the refrigerant does not flow in the ion exchanger 360, then detects an insulation resistance value r4 in a state in which the refrigerant flows in the ion exchanger 360, and determines that the decrease in insulation resistance value is temporary due to replenishment of the tank 370 with an erroneous refrigerant decreasing the insulation resistance value when the insulation resistance value is restored from the decreased value. That is, according to this embodiment, it is possible to determine whether the factor for the decrease in insulation resistance value is replenishment of the tank with an erroneous refrigerant decreasing the insulation resistance value.

In this embodiment, when the decrease in insulation resistance value in the fuel cell 104 is temporary, repair of the fuel cell 104 is not required. Accordingly, thereafter, the process of detecting the insulation resistance value r3 in a state in which a refrigerant does not flow in the ion exchanger 360, then detecting the insulation resistance value r4 in a state in which a refrigerant flows in the ion exchanger, and determining whether the insulation resistance value is restored from the decreased value may not be performed.

The disclosure is not limited to the above-mentioned embodiments and can be embodied in various forms without departing from the gist of the disclosure. For example, technical features of the embodiments corresponding to technical features of the aspects described in the SUMMARY can be appropriately exchanged or combined to solve a part or all of the above-mentioned problems or to achieve a part or all of the above-mentioned advantages. The technical features can be appropriately deleted as long as they are not described as being essential in this specification.

What is claimed is:

1. A fuel cell system comprising:
a fuel cell that generates electric power;
a plurality of electrical components that are supplied with the electric power generated by the fuel cell;
a refrigerant circuit that cools the fuel cell using a refrigerant, the refrigerant circuit comprising an ion exchanger configured to exchange impurity ions included in the refrigerant;
a tank that is connected to the refrigerant circuit, is configured to store the refrigerant, and is replenished with the refrigerant;
an insulation resistance value detecting unit configured to detect an insulation resistance value of the fuel cell system; and
an identification unit configured as an ECU to identify at what position of the fuel cell system the insulation resistance value has decreased when it is detected that the insulation resistance value has decreased,
wherein the insulation resistance value detecting unit is configured as a control circuit incorporated in an electric leakage detector connected to the ECU to perform a programmed process of determining whether a decrease in insulation resistance value is temporary when the identified position is the fuel cell and to determine that there is no failure requiring repair when the decrease in insulation resistance value is temporary, and
wherein the control circuit of the insulation resistance value detecting unit is configured to perform a programmed process to:
detect the insulation resistance value in a state in which the refrigerant does not flow in the ion exchanger;
detect the insulation resistance value in a state in which the refrigerant flows in the ion exchanger; and
determine, when the insulation resistance value is restored from the decreased insulation resistance value, whether the decrease in insulation resistance value is temporary due to replenishment of the tank with an erroneous refrigerant that decreases the insulation resistance value.

* * * * *